No. 873,896. PATENTED DEC. 17, 1907.
M. VON ROHR.
DOUBLE OBJECTIVE.
APPLICATION FILED JUNE 28, 1907.
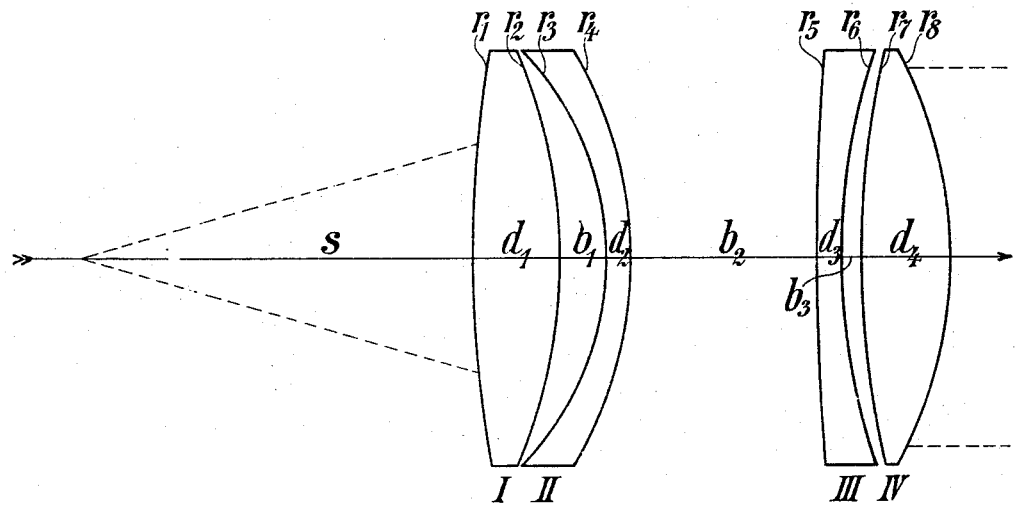

UNITED STATES PATENT OFFICE.

MORITZ VON ROHR, OF JENA, GERMANY, ASSIGNOR TO THE FIRM OF CARL ZEISS, OF JENA, GERMANY.

DOUBLE OBJECTIVE.

No. 873,896.  Specification of Letters Patent.  Patented Dec. 17, 1907.

Application filed June 28, 1907. Serial No. 381,372.

*To all whom it may concern:*

Be it known that I, MORITZ VON ROHR, doctor of philosophy, a citizen of the German Empire, and residing at Carl Zeiss strasse, Jena, in the Grand Duchy of Saxe-Weimar, Germany, have invented a new and useful Double Objective, of which the following is a specification.

The double objective according to the present invention is corrected spherically, chromatically and for coma for a very large relative aperture, because it is designed to serve as a micro-projection system or more particularly as a powerful magnifier having a large field of view. It resembles in its constitution a well-known design of a photographic double objective, of whose two identical and symmetrically arranged components each one consists of two lenses—an inner plano-concave flint glass lens with the plane surface placed innermost and an outer bi-convex crown glass lens—and presents a dispersive pair of facing surfaces the curvatures of which are unequal. The adaptation of such a symmetrical objective for the purposes mentioned above has proved to be impossible. Because of the very large relative aperture the correction of coma relatively to distant image points can only be effected, when the symmetrical arrangement of the lenses is abandoned, the component from which the pencils emerge in parallel rays is given a pair of facing surfaces of less power than the other, and in the same component the non-concave surface of the flint glass lens is made of less curvature than in the other component.

In the drawing the new double objective is represented as a magnifier having a magnifying power of nine. The constructional data respecting this magnifier are compiled in the following tables. The radii, thicknesses and distances have reference to a focal length 27.2. The relative aperture is 1:1.8, the numerical aperture 0.28.

| Radii. | Thicknesses and Distances. |
|---|---|
| $r_1 = 48.0$ | $s = 15.6$ |
| $r_2 = 20.59$ | $d_1 = 3.5$ |
| $r_3 = 11.53$ | $b_1 = 1.8$ |
| $r_4 = 15.98$ | $d_2 = 1.0$ |
| $r_5 = 101.01$ | $b_2 = 7.4$ |
| $r_6 = 25.5$ | $d_3 = 1.0$ |
| $r_7 = 35.9$ | $b_3 = 0.8$ |
| $r_8 = 17.15$ | $d_4 = 3.5$ |

| Kinds of Glass. | |
|---|---|
| I, IV | II, III |
| $n_C = 1.51339$ | 1.70863 |
| $n_F = 1.52144$ | 1.73280 |

I claim:

A spherically and chromatically corrected double objective, the components of which consist each of two lenses including a dispersive pair of facing surfaces the curvatures of which are unequal, the inner one of both lenses being made of flint glass and turning a non-concave surface towards the other component, and the component from which the pencils emerge in parallel rays presenting a pair of facing surfaces of less power and a non-concave surface of less curvature.

MORITZ VON ROHR.

Witnesses:
 PAUL KRÜGER,
 FRITZ SANDER.